United States Patent [19]

Holland

[11] Patent Number: 5,518,797
[45] Date of Patent: *May 21, 1996

[54] MARINE VESSEL FUEL SPILL PREVENTION DEVICE

[76] Inventor: Herbert W. Holland, 2314 Chimney Rock, Houston, Tex. 77056

[*] Notice: The term of this patent shall not extend beyond the expiration date of Pat. No. 5,324,429.

[21] Appl. No.: 265,418

[22] Filed: Jun. 24, 1994

[51] Int. Cl.[6] .................................................. B01D 15/00
[52] U.S. Cl. .................... 428/132; 428/35.7; 428/35.9; 428/36.1; 428/36.2; 428/36.91; 428/68; 428/76; 428/71; 428/72; 428/102; 428/195; 428/198; 428/166; 428/178; 428/136; 210/283; 210/264; 210/266; 210/284; 210/922; 210/924; 210/925; 210/693; 210/484; 588/249; 588/252; 588/255
[58] Field of Search .................. 428/35.7, 35.9, 428/36.1, 36.2, 36.91, 68, 76, 71, 72, 102, 195, 198, 166, 178, 132; 426/136; 210/283, 264, 266, 284, 922, 924, 925, 693, 484; 588/249, 252, 255

[56] References Cited

U.S. PATENT DOCUMENTS

| | | | |
|---|---|---|---|
| 3,904,528 | 9/1975 | Yocum | 210/242 |
| 4,111,813 | 9/1978 | Preus | 210/282 |
| 4,360,021 | 11/1982 | Stima | 128/287 |
| 4,497,712 | 2/1985 | Cowling | 210/691 |
| 4,747,960 | 5/1988 | Freeman et al. | 210/689 |
| 5,019,254 | 5/1991 | Abrevaya et al. | 210/169 |
| 5,071,564 | 12/1991 | Stein et al. | 210/680 |
| 5,186,831 | 2/1993 | Nepetris | 210/242.4 |
| 5,256,466 | 10/1993 | Berringan et al. | 428/166 |
| 5,324,429 | 6/1994 | Holland | 210/484 |
| 5,403,491 | 4/1995 | Holland | 210/680 |

*Primary Examiner*—William P. Watkins, III

[57] ABSTRACT

A device to capture, contain and collect hydrocarbon fuels such as gasoline and diesel before they can be spilled or leaked from the ventilation valve or fuel intake port of the fuel tank of a vessel and on to the surface of the water during fueling operations at marine fueling facilities. The device is formed as a low-profile box with a floor section and upright wall sections having stratified layers of a textile material and a solidifying polymer enclosed within a outer envelope of textile material. A seamed area at the center of the device with slits in the textile material allows the device to circumscribe the annular conduit of a device passing through the seamed area.

24 Claims, 6 Drawing Sheets

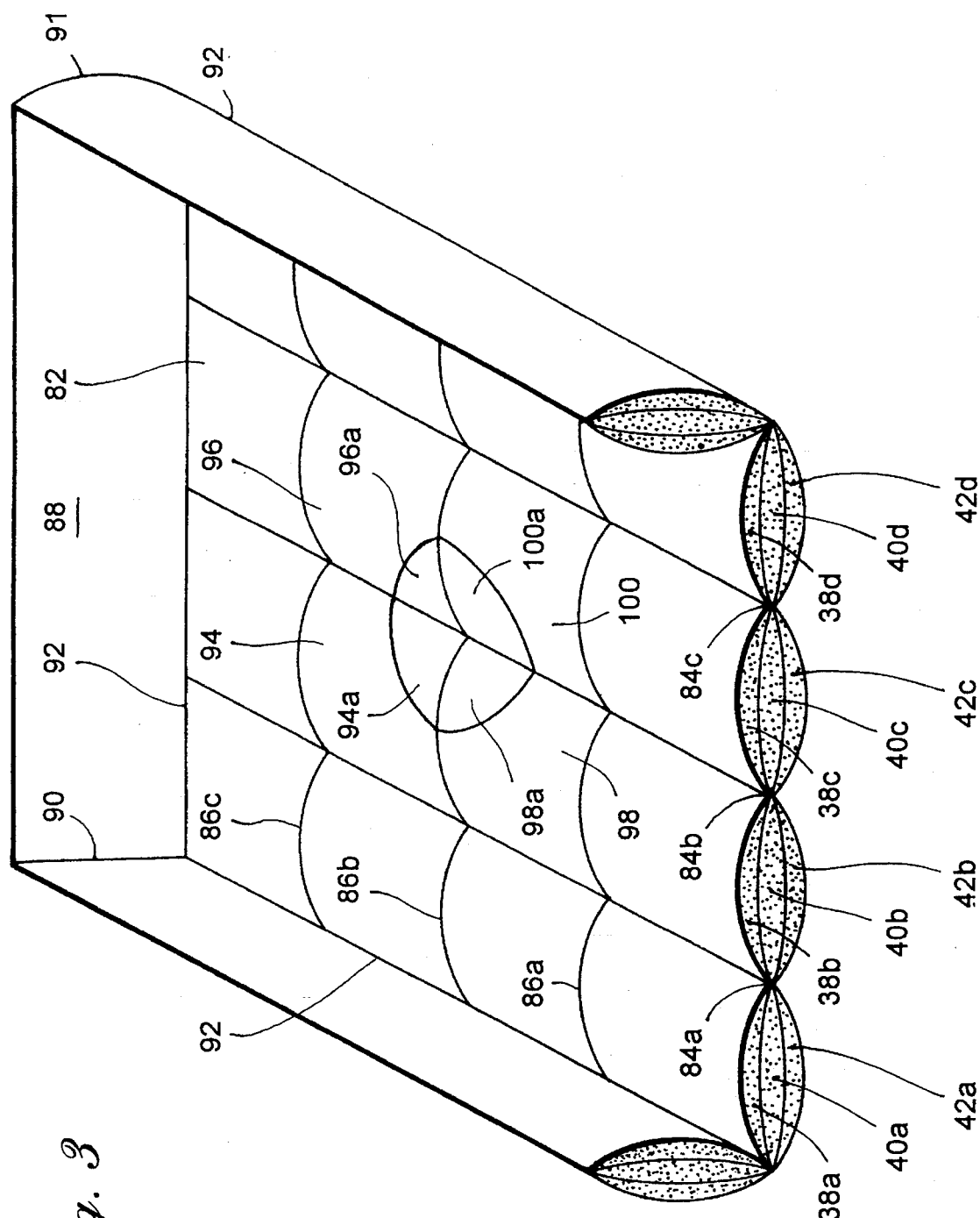

MARINE VESSEL FUEL SPILL PREVENTION DEVICE

BACKGROUND OF THE INVENTION

The present invention relates to adsorbent devices used for containing and removing liquid hydrocarbon fuels and lubricants that are leaked and spilled in the marine environment.

For marine vessel fueling facilities, there is a need to capture and contain liquid hydrocarbon fuels before they can be spilled or leaked on to the surface of the water as part of the routine fueling of vessels. Spills of this nature occur when fuel is forced out of the fuel tank of a vessel via the ventilation system of the fuel tank when it is filled to capacity or beyond, or by allowing fuel to overflow from the fuel intake port during the fueling process. Spills and leaks of fuels, stored in auxiliary fuel tanks for use in equipment such as outboard motors, are also common problems, occurring during filling and use of such auxiliary fuel tanks. The spilled fuel is then free to spread over the surface of the water.

The task of containing these spills is necessary to prevent the liquid hydrocarbons spilled or leaked on the surface of the water from spreading throughout the marine fueling facility area and polluting the adjacent waterways.

The most common method of eliminating the sheen on the water caused by these spills is to pour a dispersant such as liquid dishwashing soap on the spill. The dispersant breaks up the oily sheen into tiny particles of hydrocarbon that remain in the water and not visible to the eye without the aid of magnification. This is the most prevalent treatment of spills generated at marine fueling facilities and is currently a violation of numerous federal and state regulations and statutes with regard to the use of dispersants in the handling of spills.

Seldom is an effort made to extract the pollutants from the surface of the water when such spills occur, leaving the hydrocarbons in the water to spread throughout the adjacent waterway and pollute the environment.

Another method of dealing with spills and leaks at marina fueling facilities is to place sorbent devices such as pads, pillows and booms on the surface of the water to collect the spilled fuel. The sorbent devices are removed from the surface of the water when they have collected the liquid hydrocarbons. Little pressure is required to release the liquid hydrocarbons from the sorbent devices, thus changing the pollutant from a water borne marine contaminate into a land contaminate. The issue of proper disposal of a free flowing contaminate remains. The use of this type of sorbent devices is labor intensive, time consuming, messy and poses a potential threat of ground water pollution.

The prior art methods of dealing with liquid hydrocarbon spills at marine fueling facilities after they occur do not provide a means to contain, collect and dispose of the spills before they can reach the surface of the water. Such spills are extremely harmful to the marine environment immediately surrounding the fueling facility as well as posing a variety of health and safety hazards. The placement of a liquid detergent on the surface of the water to disperse the sheen does not remove the liquid hydrocarbons from the water. Even though the telltale sheen is removed from sight, the emulsified liquid hydrocarbons are allowed to become part of the water column.

Sorbent devices seldom recover all of the spilled fuel due to the length of time involved to deploy them and the small amount of time required for the sheen of a small amount of spilled fuel to cover a large surface area of water. Liquid hydrocarbons gathered from the surface of the water using these sorbing devices tend to release the hydrocarbons back into the environment as free flowing pollutants. When sorbent devices are extracted from the water, gravity and the column weight of the sorbed water and hydrocarbons cause the liquids to drain from the devices and back in to the environment. Once removed from the water, these sorbent device allow the sorbed pollutants to leech into the environment when they are exposed to very little pressure. Since the pollutants are never completely extracted from the water, either by emulsifying them with dispersants or totally collecting them with sorbent devices, they remain in the water to contaminate the area adjacent to the fueling facility. Marinelife and wildlife are effected by the pollution. The accumulation of liquid hydrocarbons on the surface of the water renders the water unfit for drinking or marine recreation activities as it presents a variety of health and safety hazards. The free release of pollutants into the marine environment at marine fueling facilities poses a number of concerns that are not addressed using the present method of eliminating the sheen from the surface of the water at these facilities.

SUMMARY OF THE INVENTION

In accordance with the present invention, an absorbent device is provided which will not only absorb liquid hydrocarbon fuels and lubricants that are expelled from fuel tank ventilation systems, fuel intake ports or auxiliary fuel tanks before they can be spilled on the surface of the water, but will also quickly and irreversibly solidify the absorbed liquid hydrocarbons into an easily retrievable solid rubber-like mass. The solidified hydrocarbons will not leech when exposed to pressures currently used to determine landfill suitability, and can be disposed of as landfill material. The solidified devices may also be incinerated as a fuel or used as a component of asphalt, roofing materials or other tar-like compounds.

The device is formed to resemble a low-profile, open-sided box, the open face of the five-sided box having a similar surface area to the floor-like section of the device. A quilted pillow section, forming the floor of the device, and a belt, forming the upright walls of the device, are joined by seaming one edge of the belt to the perimeter edges of the pillow, the length of the belt and the perimeter of the quilted pillow being equal.

The pillow and belt sections are comprised of a textile material sewn to form layered chambers in stratification contained within an outer envelope layer which defines the overall pillow and belt shapes. Evenly spaced, parallel seams are placed longitudinally along the center axis of the pillow, creating columns of stratified pockets. Lateral cross-seams may be placed at evenly spaced intervals from one side of the pillow to the opposite side of the pillow, crossing the center axis seam of the pillow in a perpendicular or an oblique orientation to the longitudinal seams of the pillow. Cross-seams are placed at evenly spaced intervals laterally from one edge of the belt to the opposite edge of the belt, crossing the center axis of the belt in a perpendicular or an oblique orientation to the sides of the belt. This seaming results in a quilting effect which produces a calculated number and arrangement of chambers containing an approximately equal amount of solidifying polymer.

The design and spacing of the seams creates multiple consolidation points of the stratified layers, the consolidation points acting as flow channels and defining multiple compartmented absorption cells. The consolidation seams facilitate and hastening the migration of the spill or leak to the solidifying polymer in the stratified chambers of the pillow and belt, followed by the complete absorption and solidification of the spill or leak.

An area of approximately four square inches is seamed at the center of the device. The stratified chambers within this seamed area at the center of the device contain no solidifying polymer. These stratified layers of textile material within the seamed area at the center of the device are slit to produce four distinct, sorbing but non-solidifying wicking segments which can be folded in a perpendicular angle to the plane of stratified layers of the pillow.

The device is utilized by positioning it over the fuel intake port of a vessel to allow the four wicking segments at the center of the device to be folded into the opened fuel intake port of the vessel. During fueling operations, the nozzle of the fuel supply line is passed through the folding segments when it is inserted in the fuel intake port, forcing the wicking segments into the fuel intake line of the vessel. These stratified, non-solidifying segments of the device act to facilitate the migration of any fuel backflow or overflow they absorb to the internal chambers of the device via the capillary attraction of the textile material to the liquid hydrocarbons.

The device can also be placed over the external opening of the ventilation system of the fuel tank of the vessel during fueling operations. The open side of the device is placed against the hull of the vessel, covering the ventilation valve of the fuel tank. The device effectively encloses the ventilation valve, allowing it to capture, absorb and solidify any excess fuel expelled through the ventilation system when the fuel tank reaches capacity during the fueling operation. The device can be used in a number of separate fueling activities until the total capacity to absorb and solidify fuels has been reached.

The device can also be placed under containers, such as auxiliary fuel tanks for outboard motors, to capture, contain and solidify any fuel leaks or spills that may occur; preventing the spilled or leaked hydrocarbons from being discharged overboard and into the water.

In instances where the device is to be used only to cover ventilation valves of vessels or be placed under containers of hydrocarbons to capture, contain and solidify spills and leaks; a section of stratified, solidifying polymer-filled chambers may be substituted for the folding, non-solidifying wicking segments at the center of the device The seaming of the textile material components of the device can be accomplished by several methods including mechanical stitching, thermal sealing and ultra-sonic fusing. These seaming methods are used to seal the perimeter of the device, produce the individual chambers of solidifying polymer and unite the stratified internal layers with the outer envelope. The joining of the layers of textile material results in a series of consolidation points of the layers of textile material and creates the flow channels throughout the body of the device and the belt for the migration of spills and leaks to the absorptive cells within the device.

The solidifying polymer can be placed in the device using any of several different methods. As a first example, the polymer, in its granular form, can be placed in equally measured amounts, into the open end of the device after three sides of the device have been seamed and the seams along the longitudinal axis have been placed to form side-by-side elongated pockets. The inserted polymer collects at the bottom of the pockets and a cross-seam is placed to form a polymer-filled chamber. The step of introducing polymer into the open end of the device, then sealing it into the chambers by placing a cross-seam is repeated until all the stratified chambers have been formed to create a matrix arrangement of polymer-filled chambers stratified within the outer envelope of the device. The seaming to form the matrix of chambers also acts to provide the quilting effect desired for increasing the rate of migration of the hydrocarbons to the interior of the device by the creation of consolidation points and flow channels.

Other methods of stratifying and sealing the solidifying polymer within the outer envelope of the device can be used. One method calls for the solidifying polymer to be encased and sealed within individual bags of single layer textile material, these bags being filled and sealed in an assembly-line fashion. Each bag, filled with a measured amount of the solidifying polymer, is sealed to form a solitary chamber of solidifying polymer within a single layer of textile material. Individual bags are then arranged side-by-side in a matrix configuration of rows and columns to produce a single layer of bags conforming to the designated perimeter dimensions of the finished device. Identical layers of the arrangement of polymer-filled bags are duplicated and then stratified over the first layer of bags to produce the required thickness of the device. Each layer of the arrangement of bags is positioned so the perimeter of the overall shape of the layer and the side-by-side intersections of the matrix of bags in each layer are aligned in substantial registration with the corresponding perimeter of the arrangement of bags and the side-by-side intersections of the arranged bags of the other layers. The stratified layers of individual polymer-filled bags are then enclosed within an outer envelope of textile material and sealed within the perimeter of the outer envelope. The intersections of the individual polymer-filled bags of the stratified layers are seamed to the outer envelope of the device, creating the longitudinal and cross-seams of the device used as flow channels and consolidating points of the stratified layers. The result is the required quilting effect integral to the concept.

The solidifying polymer can also be suspended within the fibers of a textile material as they are being formed, or attached to the textile material. The suspending of the polymer is accomplished by incorporating the polymer into the body of the fabric during the process used to form the textile material. This process is normally used in the production of melt-blown or spunbonded textiles. The manufacturing of a synthetic textile fabric material starts with raw petro-chemical based pellets, such as polypropylene, being blended with pigments and/or additives. This mixture is heated to the melting point of the pellets and extruded into filaments. The filaments are drawn and attenuated, using high velocity air to align the polymer molecules and maximize fiber strength. The resulting continuous, high tenacity filaments are formed into a web on a moving conveyor screen and thermally fused together with a bonding system to maximize the strength and surface stability of the fabric. The polymer is suspended within the fabric by adding it to the mix of raw petro-chemical based pellets, pigments and additives, melting the mixture and extruding filaments from the mixture. This method incorporates the polymer into the body of the filaments as they are formed.

The polymer is also suspended within the fabric by injecting an evenly distributed amount of the polymer at an intermediate point as the web of filaments are formed on the conveyor screen As the filaments are thermally fused together with the bonding system, the polymer is trapped within the fused filaments, becoming a component of the finished textile fabric material.

An evenly distributed, measured amount of the polymer can also be attached to textile material by using an adhesive to bond the polymer to a layer of material. These layers of textile material holding the polymer within its web of filaments or bonded to the polymer are stratified between two layers of textile material forming the outer envelope of the device, and seamed within the perimeter of the outer envelope of the device. Longitudinal and lateral seams are then added to the device to produce the desired quilting effect.

In each instance, the solidifying polymer is stratified and arranged between layers of textile material within the device formed by the outer envelope, with additional seams providing a quilting effect for the entire device.

The quilting of the device creates a series of continuous consolidation points of the internally stratified layers of textile material with the outer envelope of the device. The textile material absorbs the spilled or leaked liquid hydrocarbons on contact. This action, coupled with the continuous consolidation points of the internal and external layers of textile material and the unique stratification design speeds migration of the liquid hydrocarbons through the flow channels created by the quilting seams throughout the interior of the device via the capillary attraction of liquid hydrocarbons to the textile material. The result is a uniform distribution of the liquid hydrocarbons throughout the entire structure of the device for absorption and solidification by the alternating layers of solidifying polymer within the stratified layers of the device.

Typically, the density and weight of the internal layers of stratified, textile material is substantially less than the density and weight of the textile material used to form the outer envelope of the device. This is done to reduce the volume of liquid hydrocarbons that may be retained within the textile material segments of the device in the event the volume of spilled hydrocarbons the device is being used to contain and collect is in excess of the capacity of the solidifying polymer within the device. Devices fabricated of thinner textile materials of less dense construction characteristically retain a smaller volume of liquid hydrocarbons within the textile material components of the device than those devices fabricated using heavier textile materials of greater density.

Chemical composition, thickness and density of the fibers utilized in the composition of a textile material play a critically governing role in controlling the rate of absorption and the ratio of retention of the liquid hydrocarbons being sorbed by the material. Textile materials formed by using a greater density of thicker fibers are sturdier, more resistant to tearing and will sorb and retain greater volumes of liquid hydrocarbons than textile materials composed of thinner fibers or formed in a less dense configuration. Thus, a heavier material is used for the outer envelope to add to the structural integrity and durability of the envelope while a lighter textile material is used internally to form the stratified chambers of solidifying polymer. The migration of the sorbed liquid hydrocarbons throughout the interior of the device via the capillary attraction of the liquid hydrocarbons to the textile material remains a characteristic while the level of retention of the liquid hydrocarbons diminishes.

BRIEF DESCRIPTION OF THE DRAWINGS

The accompanying drawings illustrate the preferred embodiments of the invention in which:

FIG. 3 shows a cross-section of the first embodiment of the device in FIG. 1, indicating the chambers filled with polymer separated by the textile material in the pillow and belt sections of the device and the consolidation of the outer envelope with the internal layers of textile material along the edges of the pillow and belt sections and at the seams along the longitudinal axes of the pillow;

DESCRIPTION OF THE PREFERRED EMBODIMENTS

Figure 1:
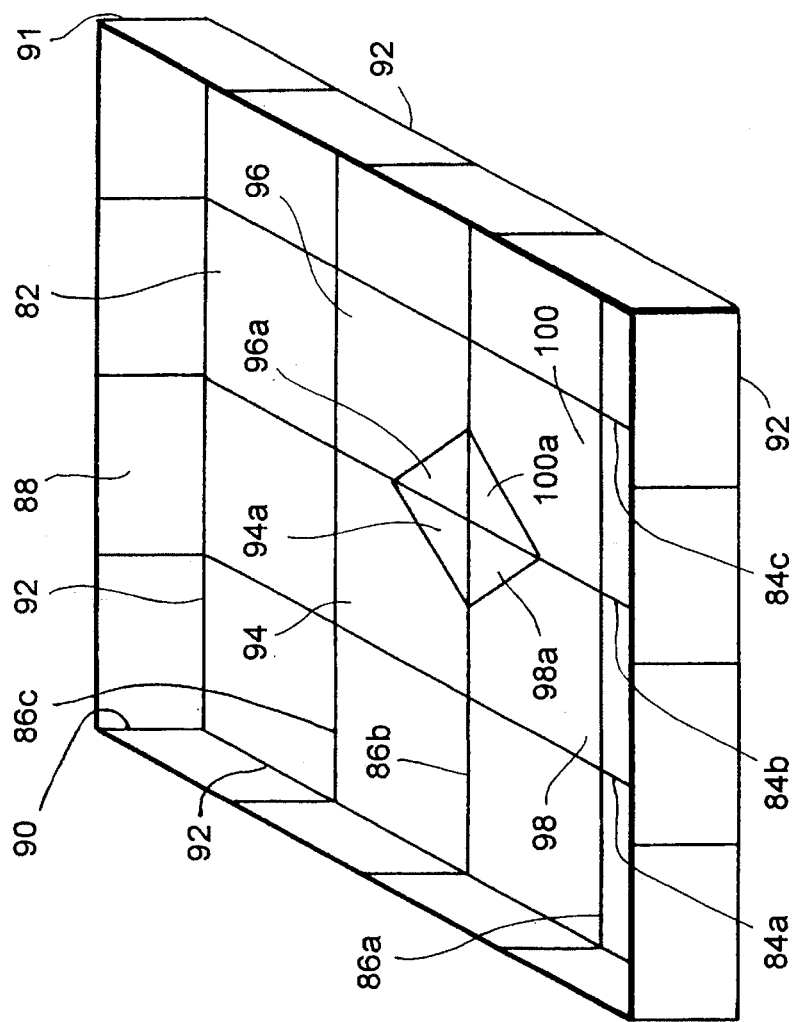
FIG. 1 is a view of a first embodiment of a device in accordance with the present invention showing its low-profile box-like form with a pillow-like floor surrounded by a belt of upright walls, the joining the pillow and belt sections of the device along their peripheries and the wicking segments at the center of the device.

In FIG. 1, a spill containment device in accordance with the present invention is shown in an open box-like device formed by joining a pillow 82 to a belt 88 by seaming the two components together. The ends of the belt are sewn together at seam 90 before it is joined to the pillow by seaming one edge of the belt to the periphery of the pillow at seam 92. Parallel seams 84a, 84b and 84c are shown sewn along the longitudinal axis of the pillow section of the device. Lateral seams 86a, 86b, and 86c are shown sewn at evenly spaced intervals from one side of the pillow to the opposite side of the pillow, crossing the longitudinal seams of the pillow in a perpendicular orientation.

Quadrants 94, 96, 98 and 100 at the center of the device are not seamed together where they intersect each other. The separation of the four central quadrants of the device allows these corners 94a, 96a, 98a and 100a, which contain no solidifying polymer, to serve as wicking segments that may be forced into the fuel intake port of a vessel during fueling operations by the fuel nozzle of the fuel supply line. These wicking segments serve to absorb any backflow of fuel that may occur and allow the fuel to migrate throughout the stratified layers of the device, via the capillary attraction of liquid hydrocarbons to the textile material, for solidification by the polymer within the stratified chambers of the device, while the body of the pillow serves to sorb and solidify any fuel overflow that may occur and would otherwise spread over the deck of the vessel and eventually into the water.

Figure 2:
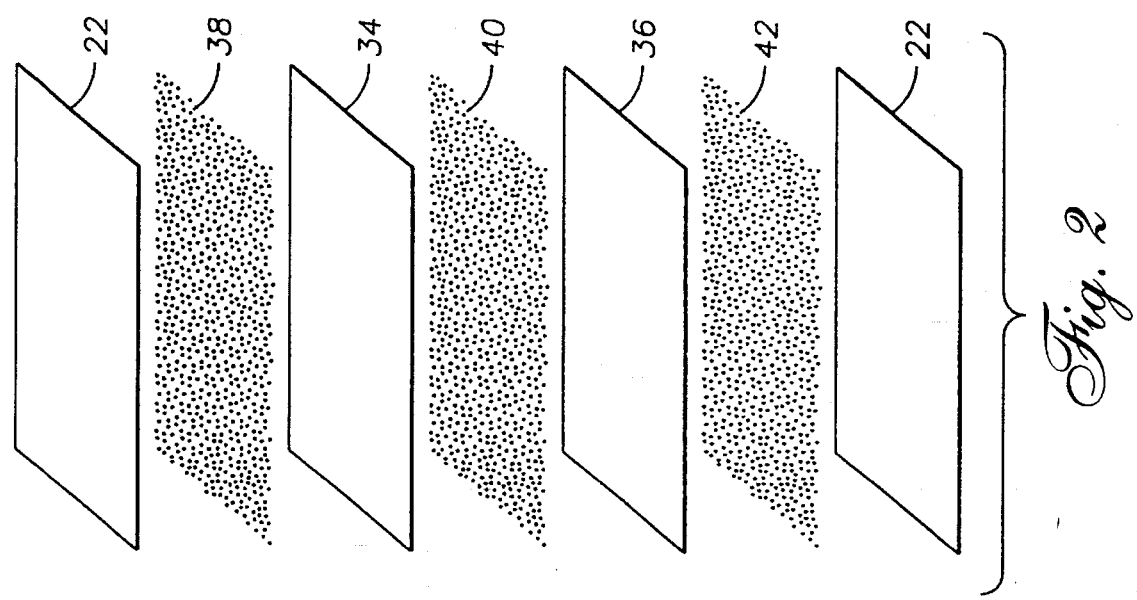
FIG. 2 is an exploded illustration of the first embodiment of the device in FIG. 1, showing alternating layers of textile material and solidifying polymer arranged to conform to the desired dimensions of the pillow and belt sections of the device within an outer envelope of textile material.

FIG. 2 is an exploded illustration of the stratification of the polymer and textile material used to fabricate the pillow and belt components of the first embodiment of the device in FIG. 1, showing alternating layers of textile material 34 and 36 and solidifying polymer 38, 40, and 42 in a stratified arrangement between the layers of textile material 22 and 22 comprising the outer envelope of the components.

Referring to FIG. 3, the cross section of the first embodiment of the device reveals the stratification design of the pillow and belt sections of the device achieved by stacking pieces of textile material 22, 34, 36 and 22 and seaming them along three edges. The resulting pockets are arranged one on top of another and enclosed by a common outer envelope of layers 22 and 22. Next, parallel seams 84a, 84b and 84c are sewn along the longitudinal center axis of the pillow, providing lines of additional consolidating points of the internally stratified layers of textile material with the outer envelope of the pillow along its longitudinal axis and creating four columns of pockets within the device.

FIG. 3 shows the effect of alternate multi-layering of textile material layers 22, 34, 36 and 22 and the consolidation of the layers along seams 84a, 84b, 84c and 92 to form an arrangement of parallel columns, each column having a stratified arrangement of pockets 38a, 40a, 42a, 38b, 40b, 42b, 38c, 40c, 42c, 38d, 40d and 42d. The stratified pockets in each of the columns are then filled with solidifying polymer and seamed closed, sealing the polymer into the body of the pillow and resulting in an arrangement of stratified polymer-filled chambers.

The polymer is inserted into the pillow by placing a measured amount of the polymer in each pocket at the open end of the pillow and allowing the polymer to drop through the pockets until it is contained by seam the seam at the edge of the pillow 92. The polymer is then sealed in the pockets with lateral seam 86c, sewn to cross seams 84a, 84b and 84c at a perpendicular angle. Seam 86c seals the polymer into chambers and creates an additional line of consolidation points of the layers of textile material. The sealing of the polymer into chambers results in an even distribution of the polymer throughout the device as it prevents loose polymer from migrating throughout the body of the device and clustering in a few areas.

The filling process is repeated, allowing the polymer to drop through the pockets until it is contained by seam 86c with seam 86b sewn to form the next section of stratified polymer-filled chambers. The process is repeated until the last section of pockets is filled with polymer. The last section of polymer-filled chambers and the pillow is seamed shut along its edge by seam 92.

The internally stratified layers of textile material are consolidated with the outer envelope of the pillow at the seams 92 around the perimeter of the pillow, and at parallel seams 84a, 84b, 84c, 86a, 86b, and 86c along the longitudinal and lateral axes of the device. This allows liquid hydrocarbons that come in contact with the outer envelope layers of textile material 22 and 22 to migrate via the seams 92, 84a, 84b, 84c, 86a, 86b, and 86c under capillary attraction to the interior layers of textile material 34 and 36 and propagate throughout the pillow.

A belt 88 comprised of internally stratified layers of chambers filled with solidifying polymer is fabricated using a like method to that utilized in filling and seaming one of the columns of stratified pockets in the pillow.

The polymer is inserted into the belt by placing a measured amount of the polymer in each of the stratified pockets at the open end of the belt and allowing the polymer to drop through the pockets until it is contained by seam 90. The polymer is then sealed in the stratified polymer-filled chambers of the belt with seam 91, sewn at a perpendicular angle to the edges of the belt. Seam 91 seals the polymer into chambers and creates an additional line of consolidation points of the layers of textile material. The sealing of the polymer into chambers results in an even distribution of the polymer throughout the belt as it prevents loose polymer from migrating throughout the body of the belt and clustering in a few areas.

The filling process is repeated, allowing the polymer to drop through the pockets until it is contained by seam 91, with another seam sewn to form the next section of stratified polymer-filled chambers of the belt. The process is repeated until the last section of pockets is filled with polymer. The last section of polymer-filled chambers and the pillow is seamed shut by seam 90.

The internally stratified layers of textile material are consolidated with the outer envelope of the belt at the seams around the perimeter of the belt, and at the seams sewn at a perpendicular angle to the edges of the belt. This allows liquid hydrocarbons that come in contact with the outer envelope layers of textile material to migrate via the seams under capillary attraction to the interior layers of textile material and propagate throughout the belt.

The seams at each end of the belt 90 and 90 are fused together before it is joined to the pillow along seam 92, resulting in a low-profile, open faced, box-like device.

In accordance with the first embodiment of the present invention directed to enclosures for fuel tank ventilation valves, fuel intake ports, auxiliary fuel tanks and the like, the pillow envelope 82 measures 12"×12"×½". Each pillow chamber contains approximately 8 grams by weight of the solidifying polymer material for an approximate total weight of 384 grams of polymer in the pillow. The belt envelope 88 measures 48"×2"×½". Each belt chamber contains approximately 8 grams by weight of the solidifying polymer material for an approximate total weight of 192 grams of polymer in the belt, for a total weight of approximately 576 grams of solidifying polymer in the device. The textile material is preferably a petro-chemical based fabric such as polypropylene, polyester or nylon. The polymer, such as polynorbornene, material is preferably an organic elastomer polymer sold under the trademark Waste-Set 3200, Waste-Set 3400, Nochar A610, Nochar A650, Enviro-Bond 403, Norsorex APX1, H-100 Environmental Spill Encapsulant or an equivalent.

Figure 4:
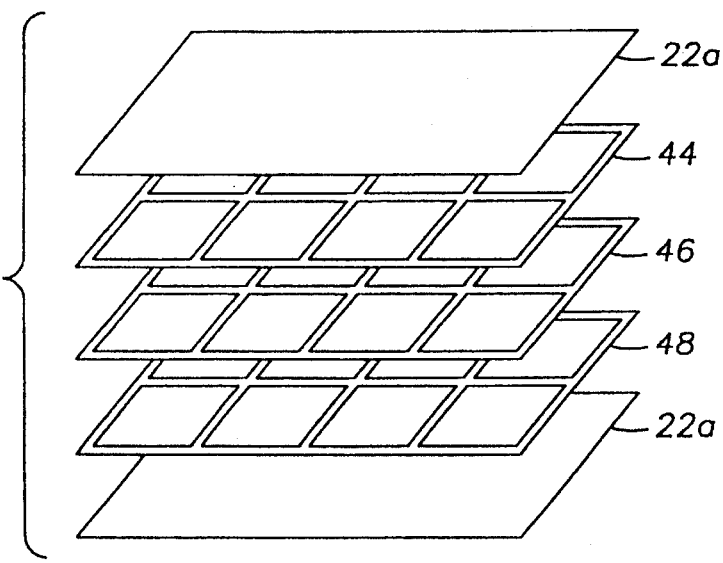
FIG. 4 is an exploded illustration of a second embodiment of the device in FIG. 1 in accordance with the present invention wherein the polymer is encased in a plurality of rectangular single-layer bags arranged to conform to the desired dimensions of the pillow and belt sections of the device and stratified to the desired thickness of the pillow and belt sections, the junctions of the individual polymer-filled bags of each layer being in substantial registration with the corresponding junctions of individual polymer-filled bags of the other layers within an outer envelope of textile material.

FIG. 4 is an exploded illustration of the stratification of the polymer and textile material used to fabricate the pillow and belt components of the second embodiment of the device in FIG. 1, showing stratified layers of individual polymer-filled bags 44, 46 and 48 in a stratified arrangement between the layers of textile material 22a and 22a comprising the outer envelope of the device.

In accordance with a modification of the second embodiment, the layers of textile material 22a and 22a comprising the outer envelope of the device can be eliminated from the structure. If this form of the second embodiment is implemented, the typical density of the material for the individual bags may be on the order of 2.0 ounce. A suitable material for use is polypropylene or a similar synthetic fabric. Thus, with reference to FIG. 4, the modified device would include the layers of individual polymer-filled bags 44, 46 and 48 in the same stratified arrangement, but without the layers of textile material 22a and 22a forming the outer envelope. Of course, the consolidation and seaming of the stratified layers that results in a quilting effect remains applicable to the modified second embodiment without an outer layer.

Figure 5:
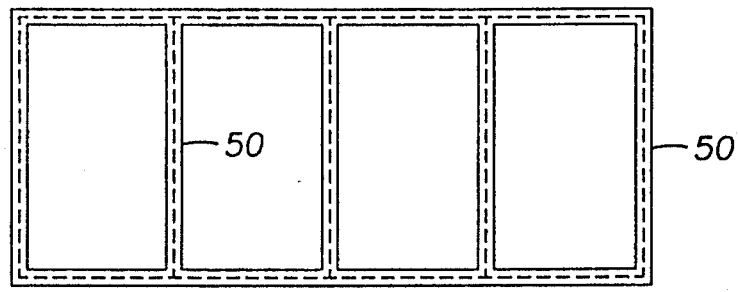
FIG. 5 shows a series of polymer-filled and sealed bags of single layer fabrication joined by an ultra-sonic seam.

Referring to FIG. 5, a series of polymer-filled and sealed bags of single layer textile material are shown joined by ultrasonic seams. This method of seaming 50 is used to encase the polymer in each of the individual bags.

The ultra-sonic seaming may also be used to seal the stratified layers of individual polymer-filled bags within the outer envelope of textile material along the perimeter of the pillow and to create the consolidation seams of the outer envelope of textile material with the substantially registered junctions of the stratified layers of individual polymer-filled bags of the exploded illustration of the device shown in FIG. 4.

Seams are used to consolidate the outer edges of the internal layers of polymer-filled bags with the outer edges of the textile material forming the outer envelope of the device, and are sewn across the pillow to consolidate the outer envelope layers with the internal layers along the junctions of the substantially registered stratified layers of individual polymer-filled bags along the longitudinal and lateral axes of the device.

These seams allow liquid hydrocarbons that come in contact with the outer envelope layers of textile material to migrate under capillary attraction to the interior layers of individual polymer-filled bags and propagate throughout the pillow.

In accordance with the second embodiment directed to enclosures for fuel tank ventilation valves, fuel intake ports, auxiliary fuel tanks and the like, the pillow envelope measures 12"×12"×½". Each pillow chamber contains approximately 12 grams by weight of the solidifying polymer material for an approximate total weight of 432 grams of polymer in the pillow. The belt envelope measures 48"×2"×½". Each belt chamber contains approximately 12 grams by weight of the solidifying polymer material for an approximate total weight of 288 grams of polymer in the belt, for a total weight of approximately 720 grams of solidifying polymer in the device. The textile material is preferably a petro-chemical based fabric such as polypropylene, polyester or nylon. The polymer material is preferably an organic elastomer polymer, such as polynorbornene, sold under the trademark Waste-Set 3200, Waste-Set 3400, Nochar A610, Nochar A650, Enviro-Bond 403, Norsorex APX1, H-100 Environmental Spill Encapsulant or an equivalent.

Figure 6:
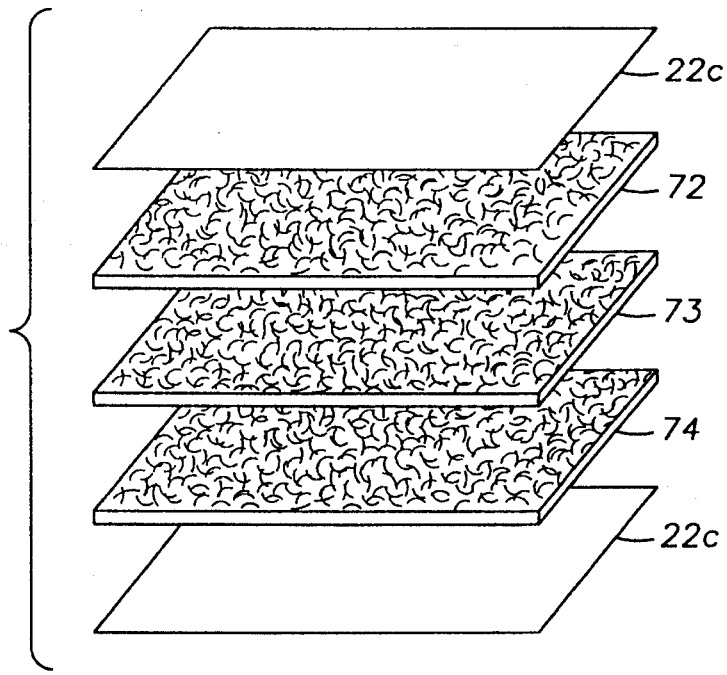
FIG. 6 is an exploded illustration a third embodiment of the device in FIG. 1 in accordance with the present invention wherein the solidifying polymer is suspended within of the textile material and arranged and stratified to conform to the desired dimensions of the device within an outer envelope of textile material.

FIG. 6 is an exploded illustration of the stratification of the polymer and textile material used to fabricate the pillow and belt components of the third embodiment of the device in FIG. 1, showing layers of solidifying polymer suspended in textile material 72, 73 and 74 in a stratified arrangement between the layers of textile material 22c and 22c comprising the outer envelope of the device.

In accordance with a modification of the third embodiment, the layers of textile material 22c and 22c comprising the outer envelope of the device can be eliminated from the structure. If this form of the third embodiment is implemented, the typical density of any single layer of polymer suspended in textile material may be on the order of 2.0 ounce. A suitable material for use is polypropylene or a similar synthetic fabric. Thus, with reference to FIG. 9, the modified device would include the layers of polymer suspended in textile material 72, 73 and 74 in the same stratified arrangement, but without the layers of textile material 22c and 22c forming the outer envelope. Of course, the consolidation and seaming of the stratified layers that results in a quilting effect remains applicable to the modified third embodiment without an outer layer.

Seams are used to consolidate the outer edges of the stratified internal layers of solidifying polymer suspended in textile material 72, 73 and 74 with the layers of textile material 22c and 22c comprising the outer envelope of the device. Additional seams consolidate the outer envelope layers with the internal layers along the longitudinal and lateral axes of the device.

These seams allow liquid hydrocarbons that come in contact with the outer envelope layers of textile material to migrate under capillary attraction to the stratified internal layers of solidifying polymer suspended in textile material and propagate throughout the device.

In accordance with the third embodiment directed to enclosures for fuel tank ventilation valves, fuel intake ports, auxiliary fuel tanks and the like, the pillow envelope measures 12"×12"×¼". Each layers of polymer suspended in textile material contains approximately 128 grams by weight of the solidifying polymer material for an approximate total weight of 384 grams of polymer in the pillow. The belt envelope measures 48"×2"×½". Each belt chamber contains approximately 12 grams by weight of the solidifying polymer material for an approximate total weight of 288 grams of polymer in the belt, for a total weight of approximately 672 grams of solidifying polymer in the device. The textile material is preferably a petrochemical based fabric such as polypropylene, polyester or nylon. The polymer material is preferably an organic elastomer polymer, such as polynorbornene, sold under the trademark Waste-Set 3200, Waste-Set 3400, Nochar A610, Nochar A650, Enviro-Bond 403, Norsorex APX1, H-100 Environmental Spill Encapsulant or an equivalent.

Figure 7:
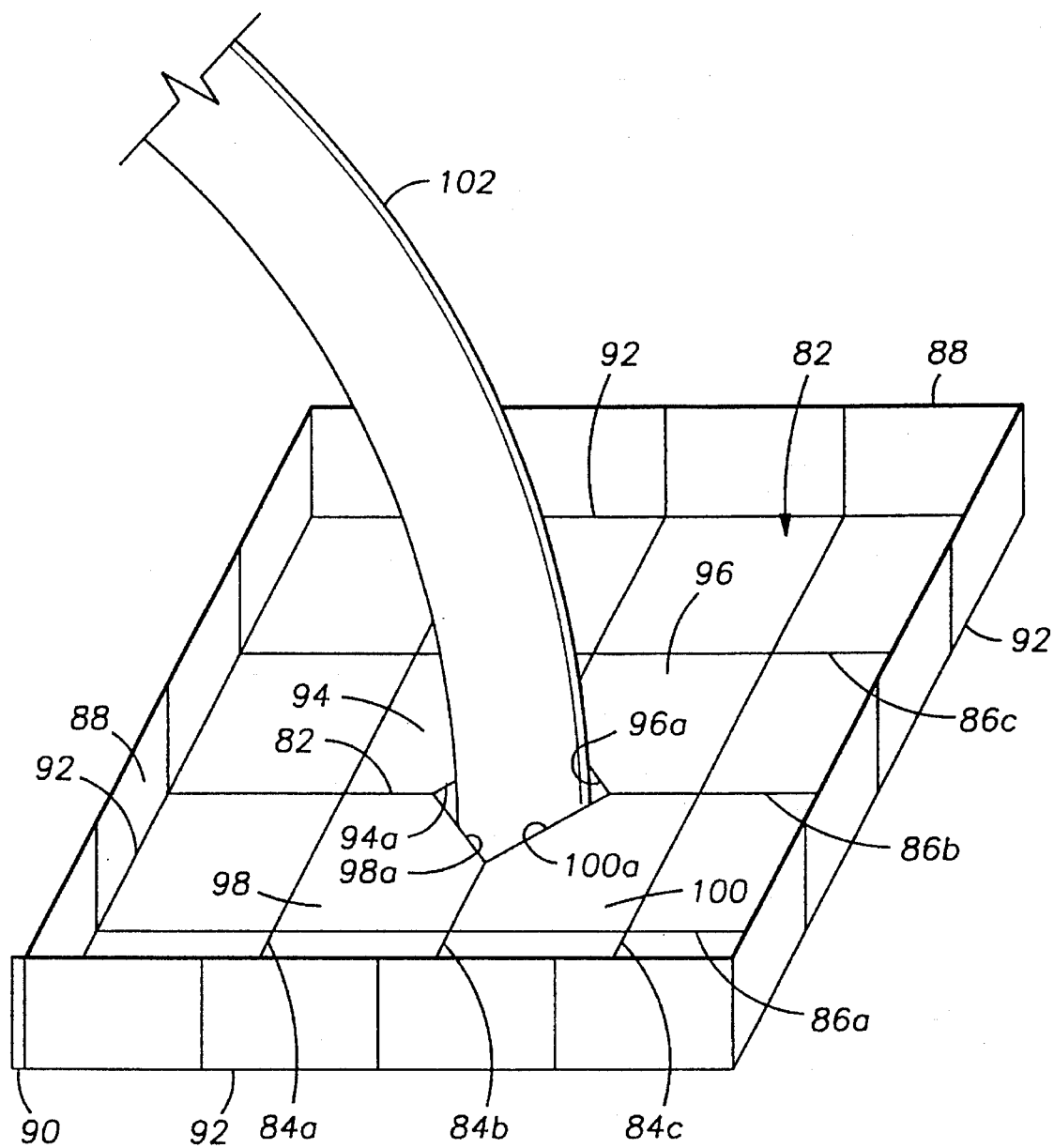
FIG. 7 shows the device placed over the fuel intake port of a vessel with the nozzle of the fuel supply line passing through the wicking segments at the center of the device.

FIG. 7 shows the nozzle of the fuel supply line 102 passing through the non-solidifying wicking segments 94a, 96a, 98a and 100a at the center of the device, after it has been placed over the fuel intake port of a vessel. The fuel supply nozzle forces the wicking segments into the fuel intake line of the vessel, allowing them to sorb any backflow or overflow of fuel that may occur.

Figure 8:
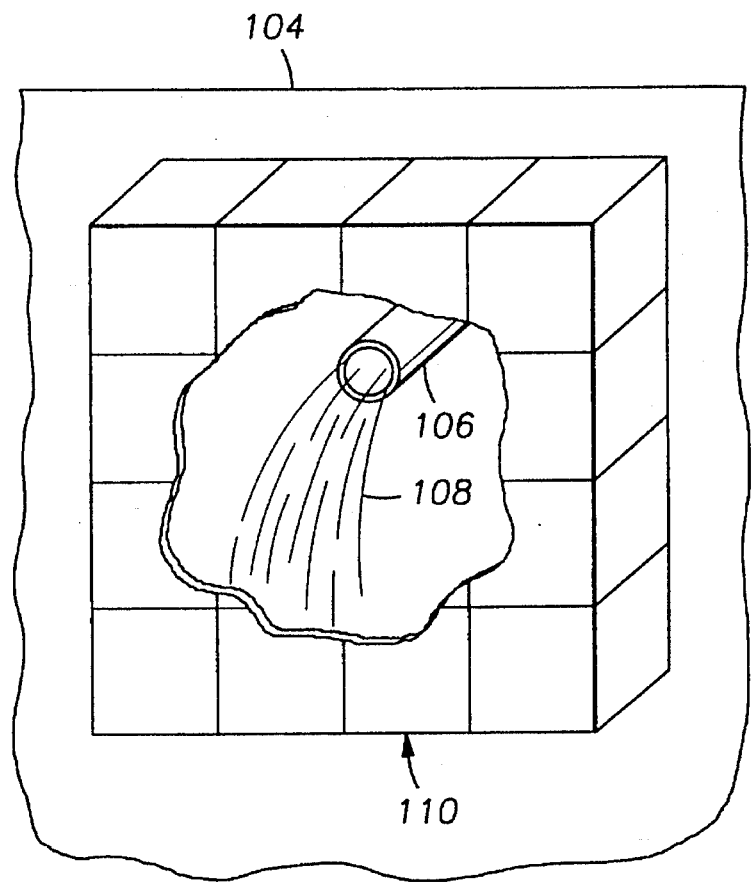
FIG. 8 shows a cut-away view of the device placed over the ventilation valve of a vessel's fuel tank, absorbing a spray of fuel being forced out of a fuel tank's ventilation system.

FIG. 8 shows the device 110 placed against the hull of a vessel 104, covering the ventilation valve 106 of the vessel's fuel tank, absorbing the spray of fuel 108 that occurs when excess fuel is forced out of the ventilation system when the capacity of the fuel tank is reached.

Figure 9:
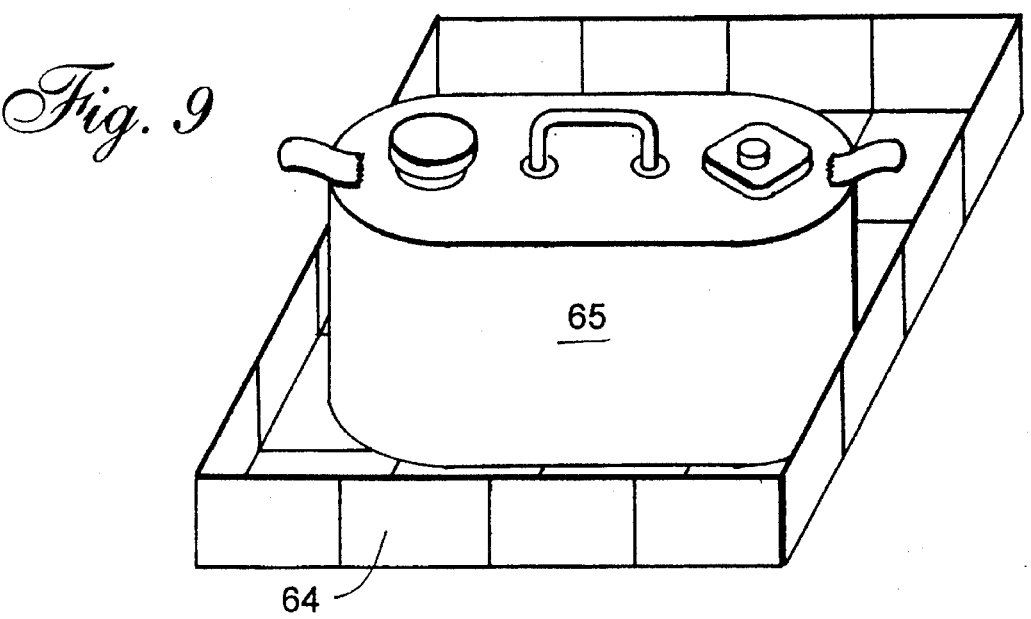
FIG. 9 shows the device placed under an auxiliary fuel container to collect, contain and solidify any leaks of the hydrocarbon fuel contained by the fuel container.

FIG. 9 shows the device 64 placed under an auxiliary fuel tank 65 of a vessel to collect, contain and solidify any leaks of the hydrocarbon fuels contained by the fuel tank.

Figure 10:
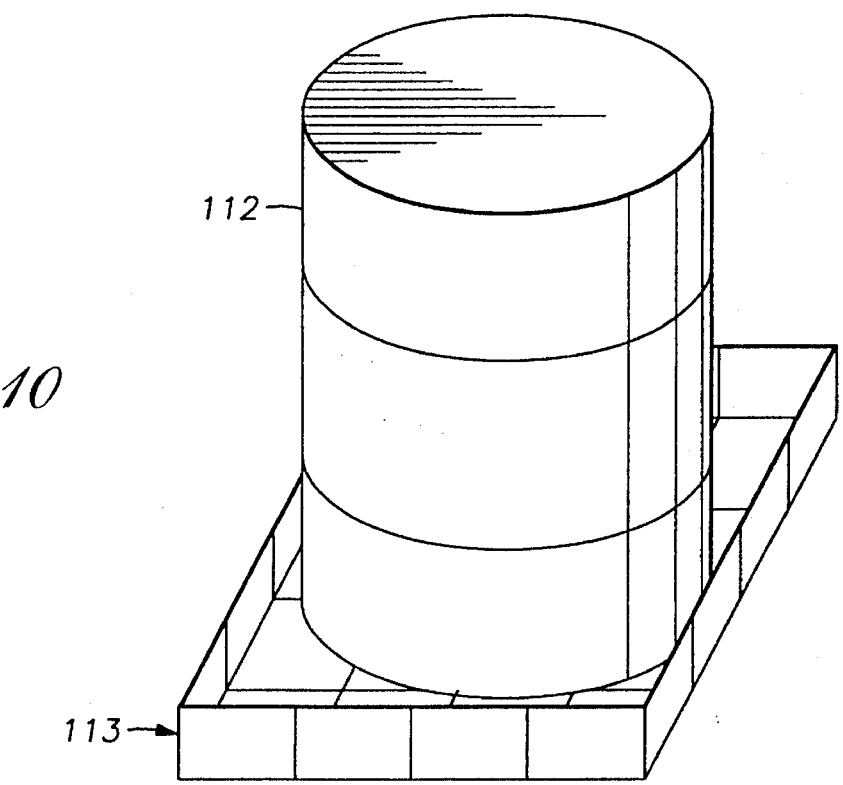
FIG. 10 shows the device in placed under a cylindrical container to collect, contain and solidify any leaks of the hydrocarbons contained within the cylindrical container.

FIG. 10 shows the device 113 placed under a cylindrical container 112 to collect, contain and solidify any leaks of the hydrocarbons contained within the cylindrical container.

Figure 11:
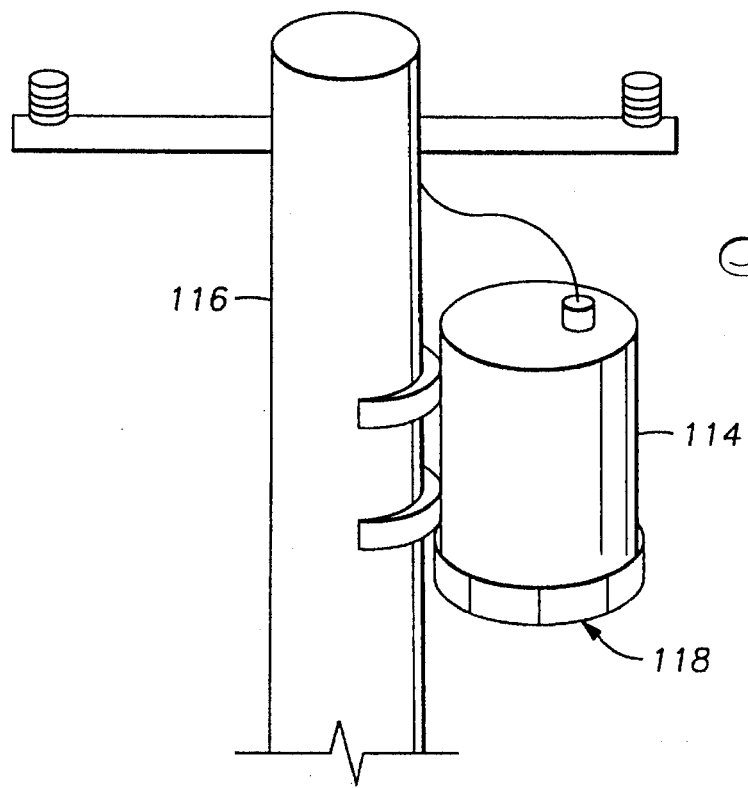
FIG. 11 the device placed and secured to the bottom of an electric transformer mounted on a utility pole, to collect, contain and solidify any leaks of the hydrocarbons contained within the transformer.

FIG. 11 shows the device 118, placed and secured to the bottom of an electric transformer 114 mounted on a utility pole 116, to collect, contain and solidify any leaks of the hydrocarbons contained within the transformer.

Ambient temperature and the viscosity of the liquid hydrocarbon to be solidified are the two most critical factors in determining the rate of absorption and the amount of time required to solidify the broad spectrum of liquid hydrocarbons this invention is designed to contain for removal and disposal. To enhance the effectiveness of the interaction of the solidifying polymer with pollutants, the method of construction of the device utilizes the layering of polymer material and textile material to control the rate of absorption and solidification.

The effectiveness of the device is further enhanced with the addition of quilting seams. The longitudinal and lateral seams of the pillow provide consolidation points of the internally stratified layers of textile material with the external textile material envelope and forms chambers within the pillow. The consolidation of the internal layers of textile material within the outer envelope speeds migration of the liquid hydrocarbons throughout the interior stratified layers of the device via the capillary attraction of the liquid hydrocarbons to the textile material. The lateral seams may also be oriented at an oblique angle to the center axis of the pillow. In either case, a quilted effect is achieved. Also, instead of a longitudinal center axis seam, a plurality of parallel longitudinal seams could be used. Further, the quilting effect may be achieved using a plurality of seams criss-crossing at oblique angles to one another so as to form the pockets in a diamond-shape rather than square or rectangular shapes.

The stratification design allows for optimum efficiency in utilizing the solidifying properties of the polymer. Very light viscosity liquid hydrocarbons react almost instantaneously with the polymer and are exposed to no more polymer than can be fully utilized for absorption and solidification. Stratification promotes rapid migration of light viscosity liquid hydrocarbons throughout the interior of the device while slowing migration of the liquid hydrocarbon through the outer surface envelope area and exposure to the polymer. The extremely rapid reaction between the light viscosity liquid hydrocarbon and the polymer could otherwise result in the loose polymer located within the volume of the device being surrounded by a non-permeable, rubber-like shell. The resulting surface blockage would thereby prevent the enclosed polymer from being used to solidify additional liquid hydrocarbons.

In addition, the stratification design allows the heavier viscosity liquid hydrocarbons that migrate through the layers of textile material to be suspended inside the device awaiting the polymer to absorb them and begin the solidification process.

The properties of the textile material that allow for rapid absorption and migration of all viscosities of liquid hydrocarbons effectively give the device maximum surface area exposure of the polymer through the stratification design.

Additional applications include, but are not limited to, a device to collect, contain and solidify hydrocarbons leaked and spilled in fueling vehicles such as automobiles and trucks, aircraft, barges and storage containers of liquid hydrocarbons. The device can also be placed under containers of liquid hydrocarbon substances to collect, contain and solidify leaks and spills of liquid hydrocarbons from such items as auxiliary fuel tanks on rail and truck fueling containers, electric utility transformers, and petrochemical plant and pipeline storage units; as well as use as a containment and clean-up product for entities charged with eliminating petrochemical spills.

In instances where the device is to be utilized exclusively to cover ventilation valves and/or be placed under containers to capture, contain and solidify spills and leaks; the folding, non-solidifying wicking segments at the center of the device may be replaced with stratified, solidifying polymer-filled chambers.

In instances where the device is to be utilized over and around a fuel intake to capture, contain and solidify fuel spills, backflow and overflow; the belt forming the upright walls along the periphery of the device may be eliminated.

The foregoing description of the preferred embodiment has been for the purpose of explanation and illustration. It will be appreciated by those skilled in the art that many modifications and changes can be made in the structure without departing from the essence of the present invention. Therefore, it is contemplated that the appended claims will cover any modifications or embodiments which fall within the scope of the invention.

What is claimed is:

1. A spill containment device comprising:
   a pillow having a plurality of chambers formed in stratification therein by internal layers of textile material;
   a polymer material disposed in the pillow chambers having a property of acting to absorb and solidify liquid hydrocarbon substances coming into contact with the device migrating to its interior;
   a plurality of quilting seams in the pillow defining a multiplicity of hydrocarbon absorption consolidation points therein and subdividing each pillow into distinct hydrocarbon absorption units within the device; and
   a seamed area at the center of the pillow, the textile material within the seamed area at the center of the pillow being void of solidifying polymer and being slit to allow the pillow to circumscribe an annular conduit adapted to pass through the center of the device.

2. The device of claim 1 further comprising a belt circumscribing the pillow, said belt having:
   a plurality of chambers formed in stratification therein by internal layers of textile material;
   a polymer material disposed in the belt chambers having a property of acting to absorb and solidify liquid hydrocarbon substances coming into contact with the device migrating to its interior; and
   a plurality of quilting seams in the belt defining a multiplicity of hydrocarbon absorption consolidation points therein and subdividing the belt into distinct hydrocarbon absorption units within the device.

3. The device of claim 1 wherein said plurality of quilting seams includes:
   a plurality of seams extending parallel to the longitudinal center axis of the pillow; and a plurality of seams extending laterally across the pillow.

4. The device of claim 1 wherein the internal layers of textile material within the pillow are stacked and interconnected by a seam joinder around their periphery.

5. The device of claim 2 further comprising a seam joinder of the pillow and the belt extending along the four contiguous sides of each.

6. The device of claim 1 wherein the polymer material is an organic elastomer polymer.

7. The device of claim 2 wherein the pillow and the belt are joined together along the periphery of the pillow and the periphery of the belt.

8. The device of claim 1 wherein the plurality of quilting seams includes:

a series of seams located longitudinally along the center axis of the layers of textile material and laterally in a perpendicular orientation to the center axis of the layers of textile material to form consolidation points of the layers that expose them to contact with liquid hydrocarbon substances and thereby promote migration of liquid hydrocarbons under capillary attraction to the chambers for absorption and solidification by said polymer material; and a seam joinder of the peripheries of the layers to promote migration of liquid hydrocarbons under capillary attraction to the chambers.

9. The device of claim 1 wherein the plurality of quilting seams includes a series of seams, at least one of which is located parallel to the longitudinal center axis of the pillow and others being located laterally in a perpendicular orientation to the center axis of the pillow, the seams providing consolidation points of the stacked layers of textile material so as to promote the dispersion of liquid hydrocarbons substantially throughout the interior of the pillow.

10. The device of claim 1 wherein the pillow and belt have a plurality of stacked layers of individual polymer-filled bags therein forming the plurality of stratified chambers, the bags being arranged side-by-side in a matrix in each stacked layer.

11. The device of claim 10 wherein the plurality of quilting seams includes a pattern of seams formed in the pillow and belt so as to be in substantial registration with the side-by-side intersections of the individual polymer-filled bags, the seams providing consolidation points of the internally stratified chambers so as to dispersively conduct liquid hydrocarbons under capillary attraction substantially throughout the interior of the pillow for absorption and solidification by the polymer material.

12. The device of claim 10 further comprising a seam joinder of the stacked layers of polymer-filled bags around their periphery.

13. The device of claim 10 wherein the individual polymer-filled bags contain an organic elastomer polymer.

14. A spill containment device comprising:

a pillow having a plurality of stacked layers of textile material, said plurality of stacked layers of textile material forming a plurality of chambers in stratification so as to dispersively conduct liquid hydrocarbons under capillary attraction substantially throughout the interior of the pillow;

a polymer material contained within the pillow to absorb and solidify liquid hydrocarbon substances, said polymer material being suspended within the fibers of the textile material;

a series of seams formed in the pillow, at least one of which is located parallel to the longitudinal center axis of the pillow and others being located substantially laterally in a perpendicular orientation to the center axis of the pillow, the seams providing consolidation points of the internally stratified chambers so as to promote dispersion of liquid hydrocarbons throughout the interior of the pillow for contact with the polymer material; and a seamed area at the center of the pillow, the textile material within the seamed area at the center of the pillow being void of solidifying polymer and being slit to allow the pillow to circumscribe an annular conduit adapted to pass through the center of the pillow.

15. The device of claim 14 further comprising a belt circumscribing the pillow, said belt having:

a plurality of stacked layers of textile material, said plurality of stacked layers of textile material forming a plurality of chambers in stratification so as to dispersively conduct liquid hydrocarbons under capillary attraction substantially throughout the interior of the belt;

a polymer material contained within the belt to absorb and solidify liquid hydrocarbon substances, said polymer material being suspended within the fibers of the textile material; and a series of seams formed in the belt, being located substantially laterally in a perpendicular orientation to the center axis of the belt, the seams providing consolidation points of the internally stratified chambers so as to promote dispersion of liquid hydrocarbons throughout the interior of the belt for contact with the polymer material.

16. The device of claim 15 further comprising a seam joinder of the pillow and the belt extending along the periphery of each.

17. The device of claim 14 wherein the polymer material is an organic elastomer polymer.

18. The device of claim 15 wherein the pillow and the belt are joined together along the periphery of the pillow and the periphery of the belt.

19. The device of claim 14 wherein the polymer material is an organic elastomer polymer.

20. A spill containment device comprising:

a pillow having an outer envelope of textile material;

a plurality of chambers formed within the outer envelope in stratification therein by internal layers of textile material;

a polymer material disposed in the pillow chambers having a property of acting to absorb and solidify liquid hydrocarbon substances coming into contact with the device migrating to its interior; and a seam joinder of the envelope and the stacked layers of internally stratified textile material providing for the consolidation of the stacked layers of textile material and the outer envelope wherein said stacked textile material layers dispersively conduct liquid hydrocarbons under capillary attraction throughout the interior of said envelope for absorption and solidification by said polymer.

21. The device of claim 20 further comprising a belt circumscribing the pillow, said belt having:

an outer envelope of textile material;

a plurality of chambers formed within the outer envelope in stratification therein by internal layers of textile material;

a polymer material disposed in the belt chambers having a property of acting to absorb and solidify liquid hydrocarbon substances coming into contact with the device migrating to its interior; and a seam joinder of the envelope and the stacked layers of internally stratified textile material providing for the consolidation of the stacked layers of textile material and the outer envelope wherein said stacked textile material layers dispersively conduct liquid hydrocarbons under capillary attraction throughout the interior of said envelope for absorption and solidification by said polymer.

22. The device of claim 20 wherein the pillow and belt have a plurality of stacked layers of individual polymer-filled bags therein forming the plurality of stratified chambers, the bags being arranged side-by-side in a matrix in each stacked layer.

23. A spill containment device comprising:

a pillow having an outer envelope of textile material;

a plurality of chambers formed within the outer envelope in stratification therein by internal layers of textile material;

a polymer material contained within the pillow to absorb and solidify liquid hydrocarbon substances, said polymer material being suspended within the fibers of the textile material; and a seam joinder of the envelope and the stacked layers of internally stratified textile material providing for the consolidation of the stacked layers of textile material and the outer envelope wherein said stacked textile material layers dispersively conduct liquid hydrocarbons under capillary attraction throughout the interior of said envelope for absorption and solidification by said polymer.

24. The device of claim 23 further comprising a belt circumscribing the pillow, said belt having:

an outer envelope of textile material;

a plurality of stacked layers of textile material within the outer envelope, said plurality of stacked layers of textile material forming a plurality of chambers in stratification so as to dispersively conduct liquid hydrocarbons under capillary attraction substantially throughout the interior of the device;

a polymer material contained within the belt to absorb and solidify liquid hydrocarbon substances, said polymer material being suspended within the fibers of the textile material; and a seam joinder of the envelope and the stacked layers of internally stratified textile material providing for the consolidation of the stacked layers of textile material and the outer envelope wherein said stacked textile material layers dispersively conduct liquid hydrocarbons under capillary attraction throughout the interior of said envelope for absorption and solidification by said polymer.

* * * * *